United States Patent
Balboni

(10) Patent No.: US 10,887,856 B2
(45) Date of Patent: Jan. 5, 2021

(54) ADAPTIVE MESH SYNCHRONIZED TIME NETWORK

(71) Applicant: Primex Wireless, Inc., Lake Geneva, WI (US)

(72) Inventor: Brian Balboni, Elkhorn, WI (US)

(73) Assignee: PRIMEX WIRELESS, INC., Lake Geneva, WI (US)

(*) Notice: Subject to any disclaimer, the term of this patent is extended or adjusted under 35 U.S.C. 154(b) by 172 days.

(21) Appl. No.: 15/670,807

(22) Filed: Aug. 7, 2017

(65) Prior Publication Data

US 2019/0045473 A1   Feb. 7, 2019

(51) Int. Cl.
*H04W 56/00* (2009.01)
*G06F 3/06* (2006.01)

(52) U.S. Cl.
CPC ... *H04W 56/0065* (2013.01); *H04W 56/0035* (2013.01); *G06F 3/0611* (2013.01); *H04W 56/0015* (2013.01)

(58) Field of Classification Search
CPC .......... H04W 56/0065; H04W 56/0035; G06F 3/0611
See application file for complete search history.

(56) References Cited

U.S. PATENT DOCUMENTS

| | | | |
|---|---|---|---|
| 7,212,468 B2 | 5/2007 | Shemesh et al. | |
| 9,319,829 B1 | 4/2016 | Hsu | |
| 2005/0259722 A1 | 11/2005 | Vanlonden et al. | |
| 2005/0286349 A1 | 12/2005 | Cook | |
| 2008/0051108 A1 | 2/2008 | Stewart | |
| 2008/0204193 A1* | 8/2008 | Zai | H04W 4/08 340/10.1 |
| 2012/0020191 A1 | 1/2012 | Shemesh | |
| 2012/0126790 A1* | 5/2012 | Sobotka | G01D 4/002 324/119 |
| 2015/0071121 A1* | 3/2015 | Patil | H04W 40/24 370/255 |
| 2015/0223047 A1* | 8/2015 | Abraham | H04W 52/0216 370/328 |
| 2016/0066249 A1* | 3/2016 | Dukes | H04W 40/246 370/255 |
| 2016/0192273 A1* | 6/2016 | Oren | H04W 40/244 370/329 |
| 2016/0282448 A1* | 9/2016 | Sen | G01S 5/14 |
| 2017/0041890 A1* | 2/2017 | Do | H04B 7/2687 |

(Continued)

*Primary Examiner* — Brian P Cox
(74) *Attorney, Agent, or Firm* — Michael Best & Friedrich LLP

(57) ABSTRACT

Synchronizing devices in a network. In one example, a first communication interface of a first communication device transmits a first message through a first communication path in a mesh network. The first communication path includes the first device, a second device, and a remote server. The first message includes a status of the first device. The first communication interface is switched to a sleep mode after transmission of the first message. Subsequently, the communication interface switches from the sleep mode to an awake mode. While the first communication interface is in the awake mode, the first communication interface transmits a second message through a second communication path in the mesh network. The second communication path includes the first device, a third device, and the remote server.

15 Claims, 6 Drawing Sheets

(56) References Cited

U.S. PATENT DOCUMENTS

2017/0086157 A1* 3/2017 Abraham ............ H04W 56/004
2017/0339733 A1* 11/2017 Kurian .................. H04W 76/23
2018/0091989 A1* 3/2018 Baroudi .................. H04W 4/70
2018/0213049 A1* 7/2018 Hegde ..................... H04L 67/28

* cited by examiner

ADAPTIVE MESH SYNCHRONIZED TIME NETWORK

FIELD

Embodiments described herein relate to the use of mesh networks to synchronize time devices.

SUMMARY

Schools, companies, and organizations that rely on meetings and schedules typically include many different time devices distributed throughout a building or campus. When these time devices are not synchronized, problems may arise due to different people within the organization operating in slightly different timelines. Some solutions provide synchronization of various time devices using, for example, a dedicated communication frequency or range of frequencies among the devices and enabling a plurality of time devices to synchronize to a single device. However, using a dedicated communication link, may also present challenges. For example, synchronization systems may have to be specially configured to meet various communication regulations in different countries, or licensing may be required in some countries to use a particular frequency range. Additionally, two-way communication may be restricted among devices, and installing transmitters and receivers specific to the dedicated communication frequency may increase the cost of deploying a synchronized time system.

Accordingly, embodiments described herein provide a method for synchronizing different devices. The method includes transmitting, via a first communication interface, a first message through a first communication path in a mesh network from a first device to a remote server. The first communication path includes the first device, a second device, and the remote server. The first message includes a status of the first device. The method also includes switching the first device to a sleep mode after transmitting the first message, and determining whether a predetermined period of time has elapsed. When the predetermined period has elapsed, the method also includes transmitting a second message through a second communication path in the mesh network from the first device to the remote server. The second communication path includes the first device, a third device, and the remote server.

In some embodiments, the first device determines the first communication path based on an RSSI value of the second device. In some embodiments, the first device determines the first communication path when the RSSI value of the second device is above an RSSI threshold. In some embodiments, the RSSI threshold is adaptable. In some embodiments, the RSSI threshold is lowered when the first device receives an RSSI value that is lower than the RSSI threshold.

In some embodiments, the method also includes receiving a third message, with the first communication interface. The third message includes a current time. The method also includes updating, with a first electronic processor of the first device, a time display of the first device based on the third message. In some embodiments, the method also includes requesting, via the first communication interface, an elapsed time between a sending of the third message and a receipt of the third message by the first communication interface, and correcting the time display based on the elapsed time.

In some embodiments, the method also includes detecting, with the first communication interface, a new device near the first device, and sending, with the first communication interface, an indication of default settings for the devices and a scheduled time to enter the awake mode.

DETAILED DESCRIPTION

Figure 1:
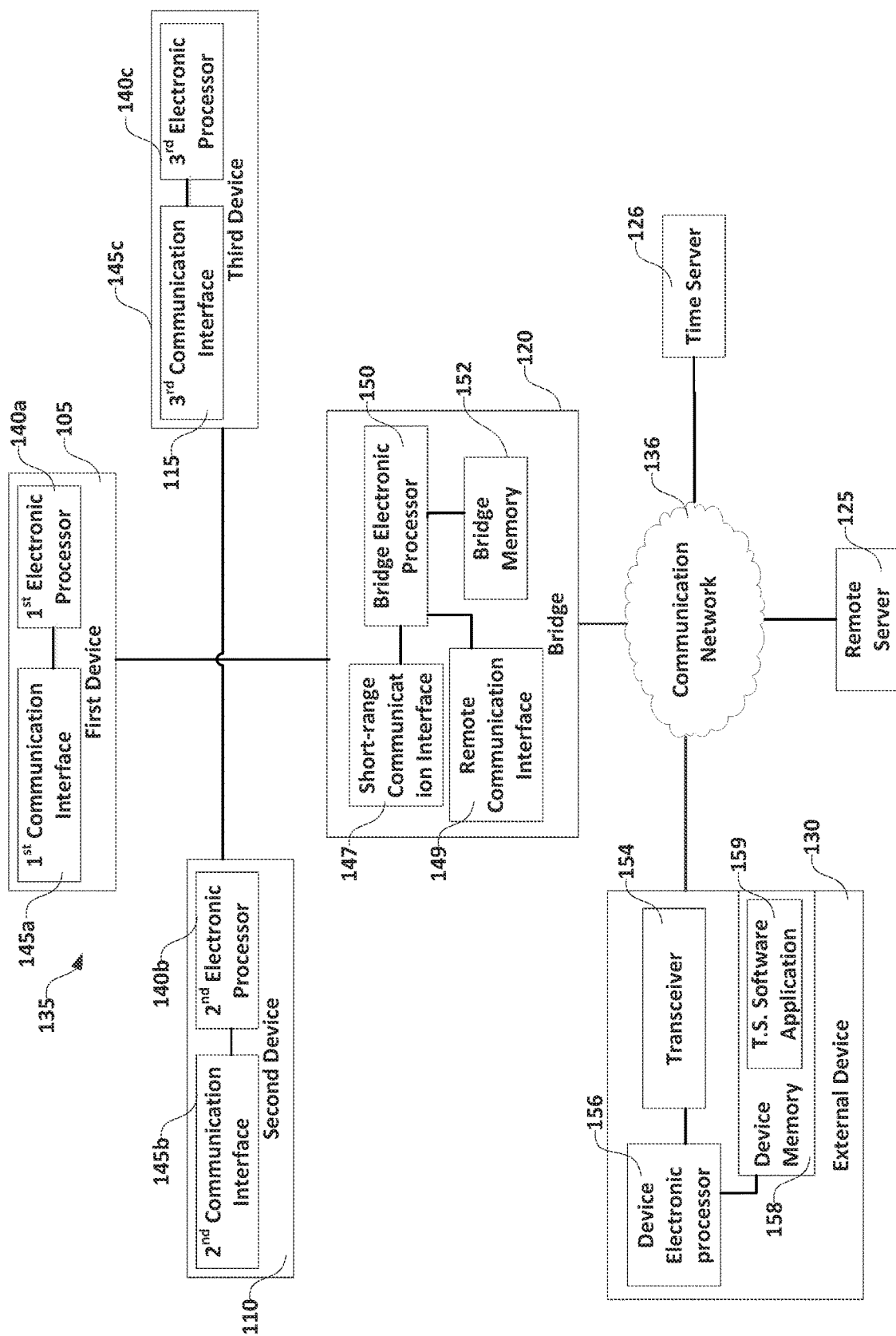
FIG. 1 is a block diagram of a synchronization system.

One or more embodiments are described and illustrated in the following description and accompanying drawings. These embodiments are not limited to the specific details provided herein and may be modified in various ways. Further, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Relational terms such as first and second, top and bottom, and the like may be used herein solely to distinguish one entity or action from another entity or action without necessarily requiring or implying any actual such relationship or order between such entities or actions.

As described above, synchronization among different time devices within a single organization may be difficult due to restrictions on communication frequencies and the inability to perform two-way communication among devices. To address these and other problems in maintaining different time devices synchronized, embodiments described herein include a mesh network of time devices implemented using, for example, a Bluetooth BLE® (i.e., Bluetooth Low Energy) communication protocol.

FIG. 1 illustrates a time synchronization system 100. In the example shown, the time synchronization system 100 includes a first device 105, a second device 110, a third device 115, a bridge 120 (also referred to as bridge device), a remote server 125, and an external device 130. The first device 105, the second device 110, and the third device 115 form a mesh, peer-to-peer network 135 with the bridge 120. The mesh network 135 allows devices, such as, for example, the first device 105, that are outside a communication range of the bridge 120 to communicate with the bridge 120 via the other devices (e.g., the second device 110 and the third device 115). The bridge 120 communicates with the remote server 125 over a network 136 to receive configuration information to synchronize the devices 105, 110, 115 and to provide information regarding the status and the settings of each device 105, 110, 115 to the remote server 125. In the illustrated embodiment, the bridge 120 receives updated time information from a time server 126 (for example, a dedicated network time server "NTP") via the network 136 and transmits status information regarding each of the devices 105, 110, 115 to the remote server 125. In some embodiments, the bridge 120 communicates with the remote server 125 both to receive updated time information and to transmit status information regarding each of the devices 105, 110, 115. Although FIG. 1 illustrates the time synchronizations system 100 as including only three devices 105, 110, 115, and one bridge 120. In other embodiments, the time synchronization system 100 includes more or fewer devices and/or bridges.

In the illustrated embodiment, the devices 105, 110, 115 use Bluetooth BLE® communication protocol to communicate with each other and with the bridge 120 in the mesh networks 135. In other embodiments, the mesh network 135 may use other standardized communication protocols such as, for example, Zigbee, NFC, Wi-Fi, and the like. Using a standardized communication protocol and frequency range enables the synchronization system to be implemented in various geographical regions with reduced need for licensing and configuration to comply with local regulations. Additionally, because some of these communication technologies are more common, materials (e.g., hardware such as transceivers and software) to implement the synchronization system 100 using these technologies may be less costly than materials required for implementing the synchronization system using a custom frequency range and communication protocol.

In the illustrated embodiment, the first device 105, second device 110, and third device 115 are time devices used for displaying a current time. For example, the devices 105, 110, 115 include a time display (not shown) that displays a current time to the user. Each device 105, 110, 115 may be an analog clock, digital clock, or other time indicator that may be incorporated as part of another device (e.g., a time display that's part of a telephone). In other embodiments, however, the devices 105, 110, 115 may not include time devices but may need to synchronize a different quantity (e.g., counters for specific events).

Each device 105, 110, 115 includes an electronic processor (e.g., shown as the first electronic processor 140a, the second electronic processor 140b, and the third electronic processor 140c in FIG. 1) and a communication interface (shown as the first communication interface 145a, the second communication interface 145b, and a third communication interface 145c). The communication interface 145a-c enables each of the devices 105, 110, 115 to form part of the mesh network 135 and exchange messages with other devices 105, 110, 115 and/or the bridge 120 directly. The communication interface 145a-c includes, for example, a transceiver compatible with the communication protocol used by the mesh network 135. Each electronic processor 140a-c may be, for example, a microprocessor, application-specific integrated circuit (ASIC), or another suitable electronic device. The electronic processor controls the operation of the communication interface 145a-c, and controls the information received and transmitted through the communication interface 145a-c. Additionally, the electronic processor 140a-c determines which devices 105, 110, 115, 120 to communicate with to form the mesh network 135. Additionally, the electronic processor 140a-c may control the time display of each device 105, 110, 115 and may calculate corrections or translation signals to update the time displays according to received information through the mesh network 135.

As described in more detail below, the devices 105, 110, 115 communicate with each other and with the bridge 120 to keep a synchronized time. In some embodiments, any one of the devices 105 110, 115 may become a master clock for some or for the rest of the devices 105, 110, 115. For example, the first device 105 may be manually set or synchronized to an external time source (e.g., the time server, a laptop computer, a smartphone, another time device, a tablet computer, or the like). The first device 105 then communicates the received time information to the rest of the devices (e.g., the second device 110 and the third device 115), thereby becoming a master clock for the mesh network 135. In another embodiment, however, the first device 105 communicates the received time information to the second device 110 thereby becoming the master of the second device 110. The second device 110, being a slave of the first device 105, forwards the time information to the third device 115 becoming a master for the third device 115. The third device 115 receives the time information and thereby becomes the slave of the second device 110. In this way, the devices 105, 110, 115 may learn their relationships to other devices upon each build of the synchronization network and operate accordingly, which allows the network formed by the devices to be self-learning and self-healing.

The bridge 120 includes a short-range communication interface 147, a remote communication interface 149, a bridge electronic processor 150, and a bridge memory 152. The bridge 120 exchanges messages from the devices 105, 110, 115 through its short-range communication interface 147, and exchanges messages with the remote server 125 and the time server 126 via its remote communication interface 149. The bridge electronic processor 150 (e.g., a microprocessor, application-specific integrated circuit (ASIC), or another suitable electronic device) determines when to send communications to which devices and/or remote servers. Additionally, the bridge memory 152 (e.g., a non-transitory computer readable medium) may store status information from each of the devices 105, 110, 115, and may store configuration settings received from the remote server 125.

In some embodiments, the bridge 120 is considered the master clock of the mesh network 135 since the rest of the devices 105, 110, 115 of the mesh network 135 obtain updated time information from the bridge 120. In other words, because the devices 105, 110, 115 are synced to the bridge 120, the devices 105, 110, 115 do not need to communicate with the remote serve 125 directly. Additionally, in some embodiments, the bridge 120 may also maintain time updated while disconnected from the remote server 125 and/or the time server 126. In such embodiments, the bridge 120 may itself include a device that obtains and keeps track of time information. For example, the bridge 120 may include a GPS antenna, a high accuracy crystal, or a WWVB 60 kHz clock source. In yet other embodiments, the bridge 120 may be coupled directly with the external device 130 or with another external device via, for example, the short-range communication interface 147 or a communication cable (e.g., a USB cable) to obtain updated time information. That is, the bridge 120 may obtain an updated time from a connected external device 130. Because the bridge 120 has the ability to become the master clock for the mesh network 135 and keep track of time by itself (e.g., without a connection to the remote server 125), the mesh network 135 may be implemented in, for example, a new construction where other networks (e.g., such as network 136) may not be installed and the synchronization system 100 may need to operate independently of the connection to the remote server 125. The bridge 120 may be a separate device that links the communications from the devices 105, 110, 115 and the remote servers 125, 126, or, in some embodiments, the bridge components may be incorporated into some of the devices 105, 110, 115. That is, the first device 105, for example, may also act as a bridge 120.

The external device 130 may be, for example, a smartphone, a laptop computer, a tablet computer, a multi-media device, or the like. The external device 130 includes a transceiver 154 that is configured to communicate with the remote server 125 over the network 136. The external device 130 also includes a device electronic processor 156 and a device memory 158. The electronic processor 156 (e.g., a microprocessor, application-specific integrated circuit (ASIC), or another suitable electronic device) is coupled to the transceiver 154 and to the device memory 158. The device memory 158 stores a time synchronization application 159. The electronic processor 156 of the external device 130 accesses the instructions stored as part of the time synchronization application 159 and executes the instructions to generate a graphical user interface that allows a user to obtain and visualize status information for the devices 105, 110, 115, and/or select configuration settings for the devices 105, 110, 115. In some embodiments, the remote server 125 may receive time and time zone information from the external device 130. In some embodiments, the external device 130 may communicate directly with the bridge 120 and may transmit the time and time zone information to the bridge 120.

Figure 2:
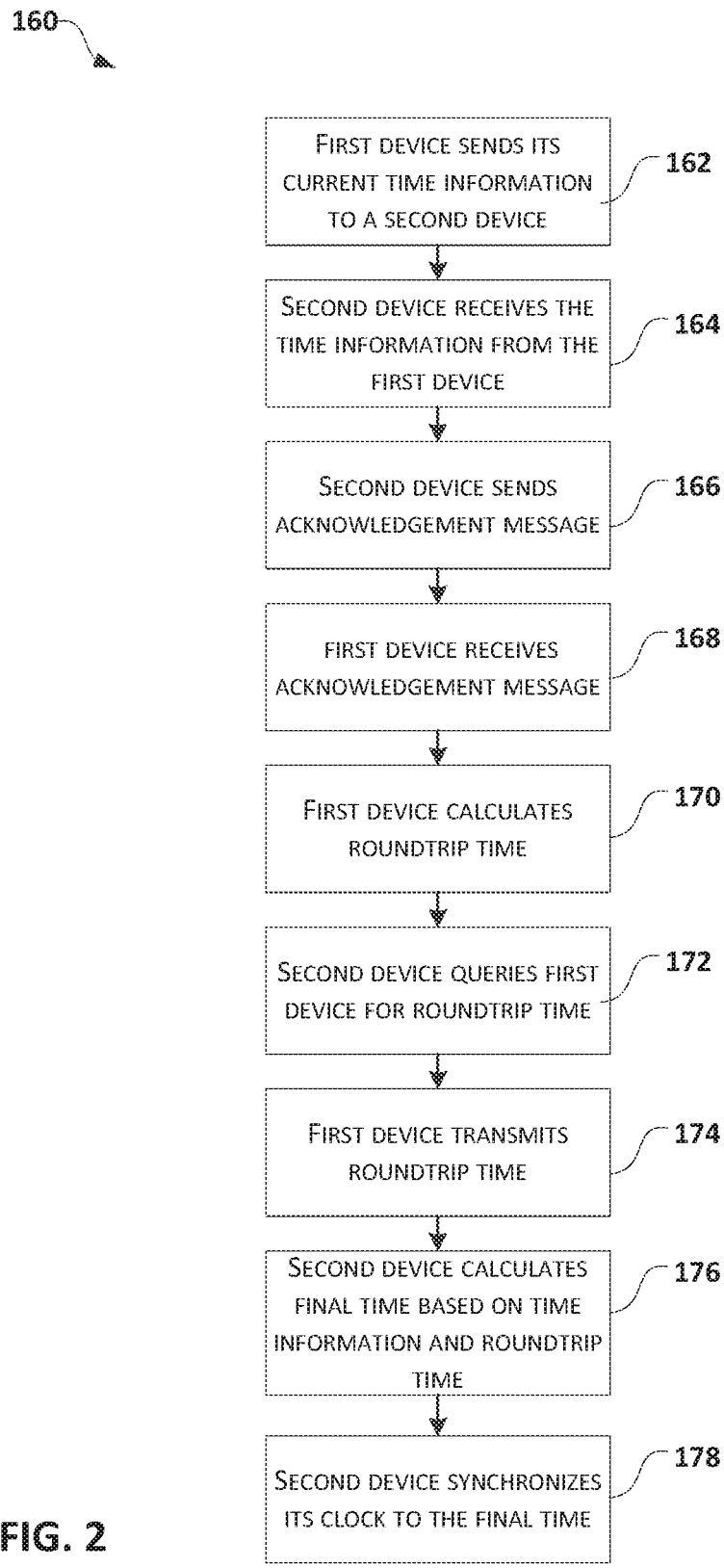
FIG. 2 is a flowchart illustrating a method of synchronizing two devices of the synchronization system.

FIG. 2 is a flowchart illustrating a method 160 of synchronizing two devices 105, 110, 115 of the synchronization system 100. A first device (for example, the bridge 120 or the first device 105) sends its current time information to a second device (in this example, to the second device 110) at block 162. The second device 110 receives the time information from the first device (block 164) and sends an acknowledgement message to the first device (block 166). The acknowledgement message indicates that the second device has received the time information. In some embodiments, the acknowledgement message also includes an identification of the second device 110. The first device receives the acknowledgement message from the second device 110 (block 168) and calculates a round trip time based on the time that the first device receives the acknowledgement message (block 170). In particular, the electronic processor of the first device (for example, the first electronic processor 140a or the bridge electronic processor 150) calculates a difference between the time the first device sends the time information and the time the first device receives the acknowledgement message. After receiving the time information, the second device 110 also queries the first device for the roundtrip time (block 172). The first device transmits the roundtrip time to the second device 110 (block 174). The second device 110 then calculates a final time based on the time information and the roundtrip time received from the first device (block 176) and synchronizes its clock to the final time. (block 178). In particular, the second device 110 calculates the final time by adding the time information received and half of the roundtrip time. In other embodiments, the second device 110 calculates a final time based on a different relationship between the time information received from the first device and the roundtrip time.

Figure 3:
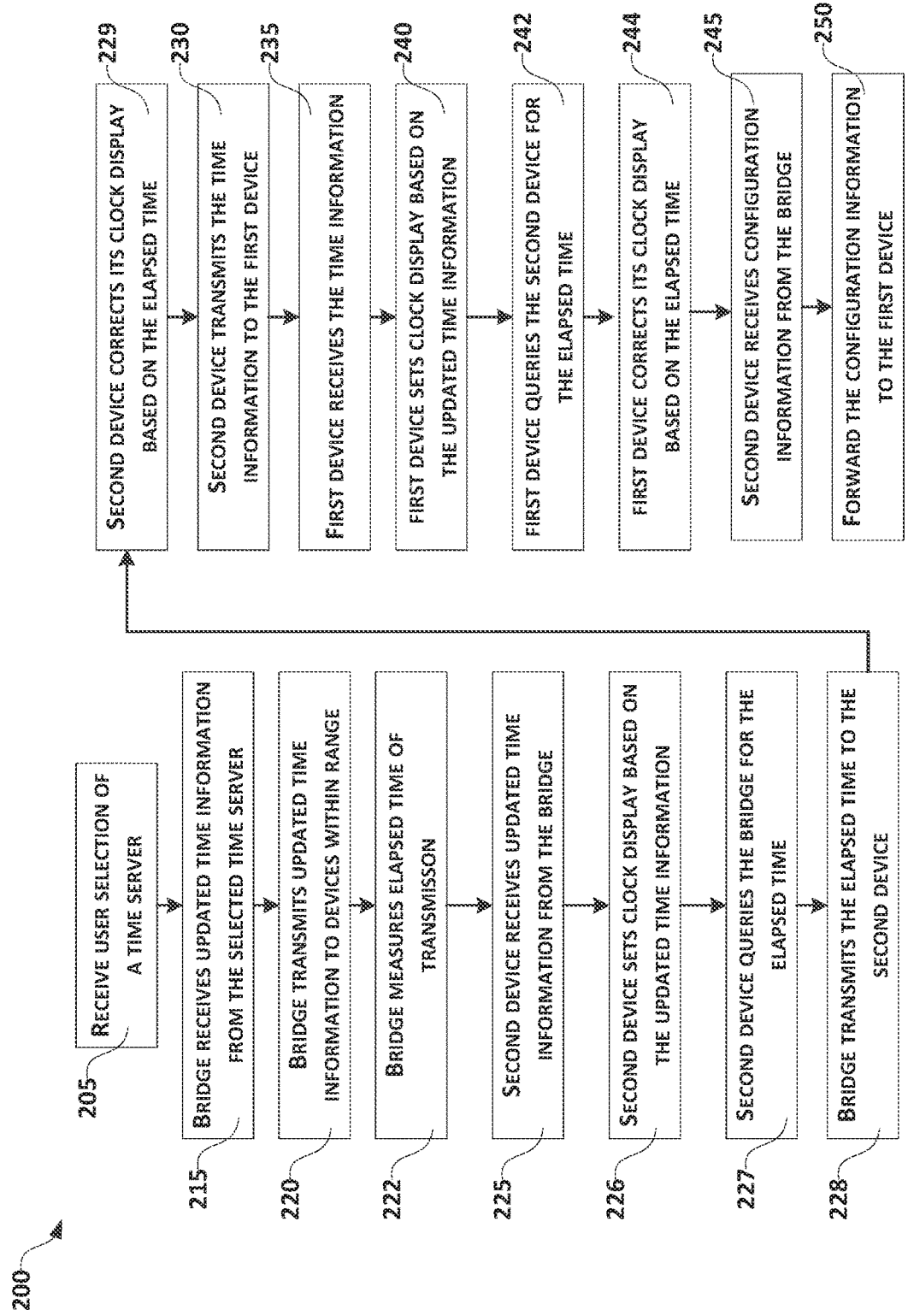
FIG. 3 is a flowchart illustrating a method of implementing a particular synchronization sequence of the devices of the synchronization system.

FIG. 3 is a flowchart illustrating a method 200 of implementing a particular synchronization sequence of the devices 105, 110, 115 according to the synchronization method 160 of FIG. 2. The remote server 125 receives a selection from a user regarding a time server to be used to maintain the devices 105, 110, 115 synchronized (step 205). For example, the user may select between receiving NTP or SNTP time from different servers. The remote server 125 may receive the user selection, for example, from the external device 130. That is, the external device 130 (e.g., the electronic processor 156 of the external device 130) may generate a graphical user interface requesting the user to select a source of time information, receiving a user input indicating the selection, and using the transceiver 154 to transmit the user selection to the remote server 125. The bridge 120 receives a message, using the remote communication interface 149, from the remote server 125 indicating which time server 126 to be used.

The bridge 120 receives updated time information from the time server 126 indicated by the user (step 215). The bridge 120 then transmits, via the short-range communication interface 147, the updated time information to the devices (e.g., the second device 110 and the third device 115) that are within the communication range of the bridge 120 (step 220). The bridge electronic processor 150 also measures a time elapsed between the instant of sending the time information to, for example, the second device 110 to the instant the time information is received by the second device 110 (step 222). The bridge electronic processor 260 measures the elapsed time based on the signals exchanged by the bridge 120 and the second device 110 (e.g., the Bluetooth LE® signals).

The second device 110, among other devices, receives, with the second communication interface 145b, the updated time information from the bridge 120 (step 225). The second device 110 sets its clock or other time display to the updated time information (step 226) and queries (e.g., via the second communication interface 145b) the bridge 120 for the elapsed time between sending of the time information and receipt of the time information by the second device 110 (step 227). The bridge 120 then sends the elapsed time to the second device 110 (step 228), and the second device 110 updates its time display based on the elapsed time (that is, adds the elapsed time to the previously received time information) (step 229).

The second communication interface 145b then transmits the time information to the first device 105 (step 230). The first communication interface 145a receives the updated time information (step 235). The first device 105 then updates its time display to reflect the updated time (step 240), and queries the second device 110 for the elapsed time between sending of the time information and the receipt of the time information by the first device 105 (step 242). The first device 105 then corrects its time display (step 244) according to the elapsed time. In some embodiments, steps 240-244 are considered to be part of updating the time display of the first device 105 based on received time information. In the illustrated embodiment, the second device 110 also receives configuration data from the bridge 120 (step 245). The second communication interface 145b then also forwards the configuration data to the first device 105 (step 250). Configuration information may include, for example, time zone changes or changes due to daylight savings time, or the like.

In some embodiments, the first device 105 sends status information to the bridge 120 utilizing the second device 110 as a connecting node of the mesh network 135. For example, the first device 105 may send a battery level of the first device 105, connectivity statistics such as, which other devices the first device 105 has communicated with, what the communications have included, and the like. The status information may also include diagnostic codes associated with the first device 105, an associated RF signal level (e.g., RSSI level) of the first communication interface 145a, and a time accuracy of the first device 105. The second interface 145b receives and forwards the status information from the first device 105 to the bridge 120. The bridge 120 then transmits the status information from the second device 110 to the remote server 125. In some embodiments, the bridge 120 also stores at least some of the status data corresponding to each device 105, 110, 115.

Figure 4:
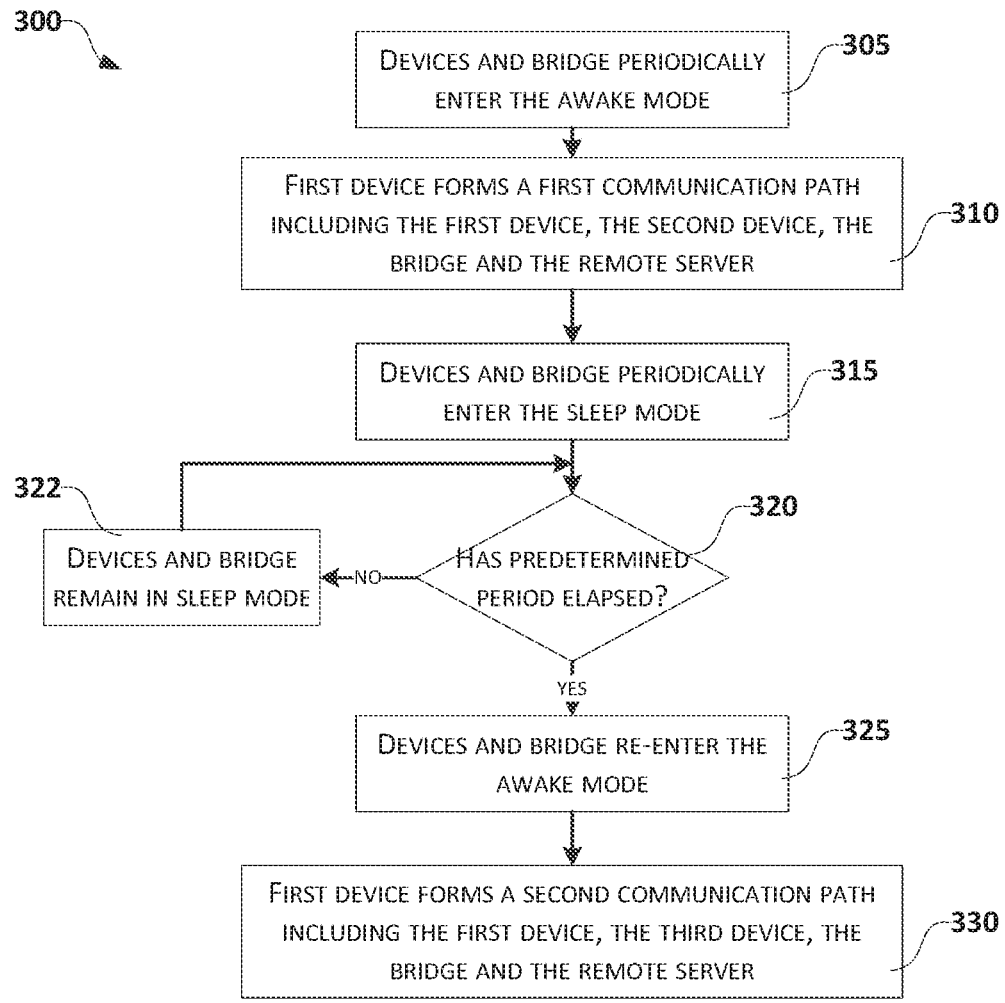
FIG. 4 is a flowchart illustrating a method of building a mesh network upon entering an awake mode

FIG. 4 is a flowchart illustrating a method 300 of building a mesh network upon entering an awake mode. The first, second, and third communication interfaces 145a-c as well as the short-range communication interface 147 of the bridge 120 periodically enter an awake mode (step 305). During the awake mode, the devices 105, 110, 115 receive messages from the bridge 120 indicating an updated time and/or updated settings for the devices 105, 110, 115. Analogously, during the awake mode, the bridge 120 receives status information from each of the devices 15, 110, 115. To exchange these messages, each device 105, 110, 115 sends its message to a nearby connecting node (e.g., another device) or the bridge 120 directly upon entering the awake mode. For example, as shown in FIG. 4, the first device 105 transmits a message to the second device 110, which then transmits the message to the bridge 120. That is, the first device 105 forms a first communication path including the first device 105, the second device 110, the bridge 120, and the remote server 125 before any status or configuration messages are exchanged (step 310). After exchanging messages during the awake mode, the first, second, and third communication interfaces 145a-c and the short-range communication interface 147 enter a sleep mode (step 315). During the sleep mode, the devices 105, 110, 115 and the bridge do not exchange any messages, or are inhibited from exchanging messages. Entering the sleep mode periodically after the awake mode allows the devices 105, 110, 115 to consume less power than if the communication interfaces 145a-c, 147 remained active.

The communication interfaces 145a-c, 147 remain in the sleep mode for a predetermined period of time after which they enter the awake mode again. The electronic processor of each of the devices determines when the predetermined period has elapsed and the communication interface should return to the awake mode. For example, the first electronic processor 140a determines whether the predetermined period has elapsed (step 320). When the first electronic processor 140 determines the predetermined period has not elapsed, the devices remain in sleep mode (step 322). When the first electronic processor 140a determines that the first predetermined period has elapsed, the communication interfaces 145a-c, 147 re-enter the awake mode. (step 325).

Upon reentering the awake mode, the devices 105, 110, 115 are once again able to communicate with the bridge 120. When, however, the first device 105 reenters the awake mode, the first device 105 restarts the process of building a communication path. In other words, instead of accessing a memory that stores the first communication path, the first device forms a second communication path including the first device 105, the third device 115, the bridge 120, and the remote server 125 (step 330). Notably, the first device 105 selects the third device as a connecting node instead of the second device 110.

By creating a new communication path, the mesh network 135 can adapt to changing environments and/or compensate for malfunctioning devices. For example, during the sleep mode, the second device 110 may have been removed from the network, may have depleted its battery, or the second communication interface may have malfunctioned. Because the first device 105 creates a new communication path each time the first communication interface enters the awake mode, the lack of the second device 110 does not affect the ability of the first device 105 to communicate with the bridge 120. Instead, the first device 105 simply switches to using the third device 115 as the connecting node to the bridge 120. Likewise, a device 105, 110, 115 can alternate between bridges if more than one bridge is used in a particular implementation. A new bridge can also be added to a particular mesh network without reconfiguring the network. Rather, the bridge will be detected as having communication access to the remote server 125 and automatically incorporated into the mesh network 135. After exchanging messages via the second communication path, the communication interfaces return to the sleep mode, and continues alternating between the awake mode and the sleep mode.

Figure 5:
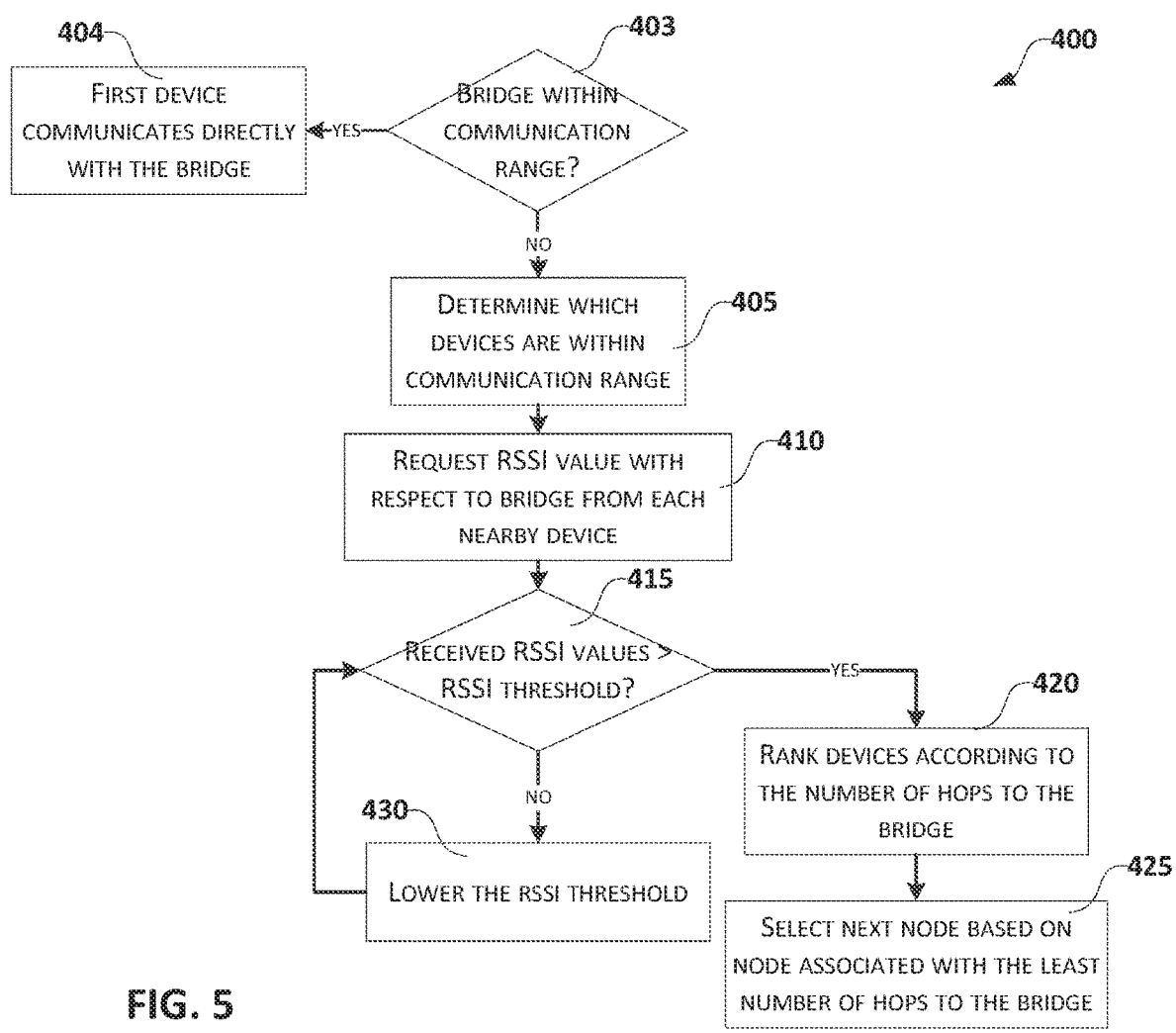
FIG. 5 is a flowchart illustrating a method of selecting a next node when building the mesh network.

FIG. 5 is a flowchart illustrating a method 400 of selecting a next node when building a mesh network. First, as shown in FIG. 5, the first device 105 determines whether the bridge 120 is within the communication range of the first device 105 (step 403). When the bridge 120 is within the communication range of the first device 105, the first device 105 communicates directly with the bridge 120 (step 404). On the other hand, when the bridge 120 is outside the communication range of the first device 105, the first device 105 (e.g., the first electronic processor 140a) determines which other devices 105, 110, 115 are within the communication range of the first device 105 (step 405). The first device 105 then requests an RSSI from each of the devices within its communication range (step 410). For example, in the illustrated embodiment, the first device 105 requests an RSSI from the second device 110 and the third device 115. The RSSI is indicative of the signal strength and signal quality between the specific device and the bridge 120. That is, the second device 110 may indicate an RSSI of 60 while the third device 115 may provide an RSSI of 40. Based on these exemplary values, the second device 110 is closer and/or has a better quality connection with the bridge 120 than the third device 115.

The first electronic processor 140a then determines whether the received RSSI values are above an RSSI threshold (step 415). In other words, the first electronic processor 140 compares the received RSSI value with the RSSI threshold. When at least one received RSSI value is greater than the RSSI threshold, the first electronic processor 140a ranks the RSSI values according to the number of hops to the bridge 120 associated with each device (step 420). For example, for each device, the first electronic processor 140a determines how many hops are needed from the device to the bridge 120. The first electronic processor 140a then ranks the devices based on which devices require the least number of hops to reach the bridge 120. The first electronic processor 140a then selects the next connecting node based on the device that is associated with the least number of hops to the bridge 120 (block 425). That is, the first electronic processor 140a sends a message (including, for example, time information) to the device that is associated with an RSSI value higher than the RSSI threshold and that is associated with the least number of hops to the bridge 120. In this example, the first device 105 selects the second node 110 as the connecting node to the bridge 120. On the other hand, when the received RSSI values are below the RSSI threshold, the first electronic processor 140a lowers the RSSI threshold (step 430) and compares the received RSSI to the lowered RSSI threshold (415). Steps 430 repeats until at least one received RSSI value is greater than the RSSI threshold. The first device 105 then connects to the device associated with the RSSI value that exceeds the RSSI threshold (step 425). By choosing the connection mode based on a received RSSI value, the mesh network 135 can reduce the number of total hops necessary for a message to reach the bridge 120 from any given device 105, 110, 115. Because this process is repeated each time the devices 105, 110, 115 enter the awake mode, the mesh network 135 is self-healing since it can easily adapt to more or less device nodes being available. By lowering the RSSI thresholds over time, devices at greater distances from the bridge 120 or with lower RSSI values to connect, thereby increasing connectivity under poorer signal conditions. Additionally, building the network as described with reference to FIGS. 3 and 4, the network traffic is minimized (e.g., by minimizing the number of hops from a particular device 105, 110, 115 to the bridge 120.

Figure 6:
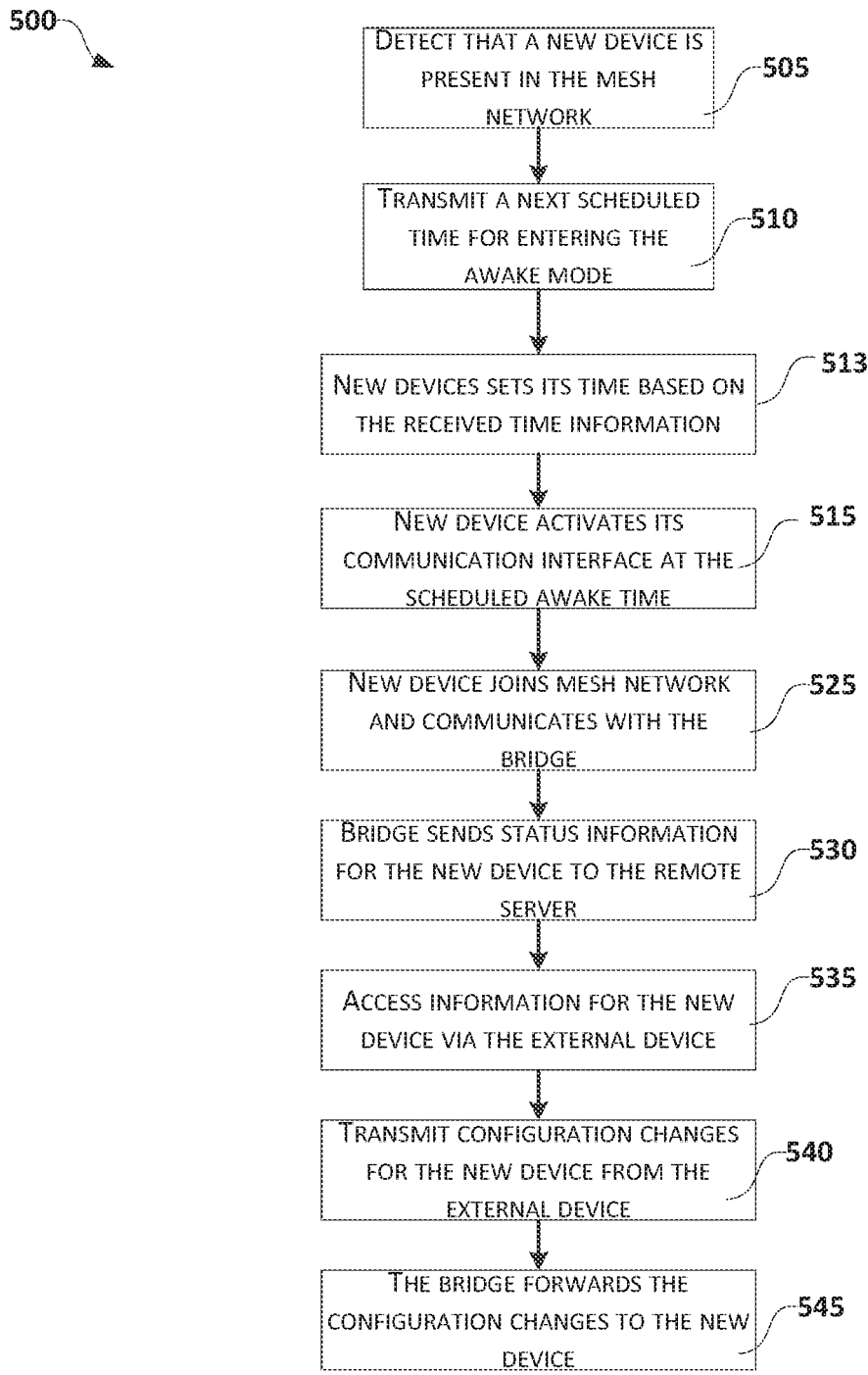
FIG. 6 is a flowchart illustrating a method of adding a new clock to the synchronization system.

FIG. 6 is a flowchart illustrating a method 500 of adding a new device (e.g., a fourth device) to the mesh network 135. As shown in FIG. 6, the first device 105 detects that a new device (e.g., a fourth device) is present (step 505). In particular, when a new device is added, the new device broadcasts its presence when it is activated (that is, when power is provided to the new device). The first device 105 may be set to listen to, for example, 500 milliseconds of every second. Accordingly, the first device 105 may detect the new device when the first device 105 receives the broadcast communication from the new device. The first device 105 then transmits, via the first communication interface 145a, the next time upon which the devices 105, 110, 115 are to enter the awake mode, that is, the "wake-up" time (step 510). The first device 105 may, in the same message, include a current time, and the default settings associated with the devices 105, 110, 115 (e.g., time zone, daylight savings time settings, and the like). The new device then synchronizes its time to the received time information such as the current time (block 513). At the next time the devices 105, 110, 115 are to enter the awake mode, the new device also activates its communication interface (step 515). This method allows the new device to synchronize its time prior to the next awake time of the network. The new device is then able to join the mesh network 135 and the bridge 120 then can also communicates to the new device via the mesh network 135 (step 525). The bridge 120 also transmits the status information for the new device to the remote server 125 (step 530). The external device 130 may then access more information regarding the new device by connecting to the remote sever 125 (step 535). A user may also change some of the settings associated with the new device via the graphical user interface generated by the device electronic processor 156, and the transceiver 154 transmits the changes to the remote server 125 (step 540). The remote server 125 then transmits the setting changes to the bridge 120, which then informs the new device of the setting changes (step 545).

Accordingly, embodiments described herein provide, among other things, an adaptable time synchronization system that adapts to changing conditions in the mesh network and easily incorporates new devices into the mesh network.

The invention claimed is:

1. A method of synchronizing devices in a network, the method comprising:
transmitting, with a first communication interface of a first device, a first message through a first communication path in a mesh network, the first communication path including the first device, a second device, and a remote server, the first message including a status of the first device, wherein the first communication path is determined based on a first RSSI value associated with the second device and a least number of hops from the second device to the remote server;
switching the first communication interface to a sleep mode after transmission of the first message;
switching the first communication interface from the sleep mode to an awake mode;
while the first communication interface is in the awake mode, transmitting, with the first communication interface, a second message through a second communication path in the mesh network, the second communication path including the first device, a third device, and the remote server;
detecting, with a first electronic processor of the first device, a new device within a communication range of the first device;
transmitting, via the first communication interface, to the new device an indication of default settings associated with the first device and a scheduled time to enter the awake mode, wherein the default settings include at least one of a time zone of the first device and daylight savings time settings, and
prior to the first device, second device, and third device being switched from the sleep mode to the awake mode, synchronizing, with an electronic processor of the new device, a time of the new device.

2. The method of claim 1, wherein transmitting the first message includes
receiving, with the first communication interface, the first RSSI value associated with the second device;

receiving, with the first communication interface, a second RSSI value associated with the third device; and
transmitting the first message via the first communication path based on a comparison of the first RSSI value and the second RSSI value to an RSSI threshold.

3. The method of claim 2, wherein transmitting the first message based on the comparison of the first RSSI value and the second RSSI value to the RSSI threshold includes transmitting the first message via the first communication path when the first RSSI value is greater than the RSSI threshold and the second RSSI value.

4. The method of claim 2, wherein transmitting the second message includes:
 receiving, with the first communication interface, a third RSSI value associated with the second device;
 receiving, with the first communication interface, a fourth RSSI value associated with the third device; and
 transmitting the second message via the second communication path when the fourth RSSI value is greater than the RSSI threshold and the third RSSI value.

5. The method of claim 2, further comprising changing the RSSI threshold when the first RSSI value and the second RSSI value are below the RSSI threshold.

6. The method of claim 1, further comprising:
 receiving, with the first communication interface, a third message from the second device, the third message including a current time; and
 updating, with a first electronic processor of the first device, a time display of the first device based on the third message.

7. The method of claim 6, wherein updating the time display includes:
 transmitting, via the first communication interface, an acknowledgement message to the second device in response to receiving the third message;
 requesting, via the first communication interface, an elapsed time from the second device, the elapsed time corresponding to time elapsed between sending the third message and receiving the acknowledgement message; and
 updating, with a first electronic processor of the first device, the time display of the first device based on the elapsed time.

8. The method of claim 1, further comprising:
 while the first communication interface is in the sleep mode, determining, with a first electronic processor of the first device, whether a predetermined period has elapsed; and
 wherein switching the first communication interface to the awake mode includes switching the first communication interface to the awake mode in response to determining that the predetermined period has elapsed.

9. A time synchronization system comprising:
 a first time device including
  a first communication interface configured to:
   switch between an awake mode in which the first communication interface receives and transmits messages, and a sleep mode in which the first communication interface is inhibited from transmitting messages to a second device,
   transmit a first message through a first communication path, the first communication path including the first time device, the second device, and a bridge device, the first message including a status of the first time device, wherein the first communication path is determined based on a first RSSI value associated with the second device and a least number of hops from the second device to the bridge device; and
  a first electronic processor configured to
   control the first communication interface to enter the sleep mode after transmission of the first message, and
   control the first communication interface to switch from the sleep mode to the awake mode, and
   control the first communication interface to send a second message through a second communication path, the second communication path including the first time device, a third device, and the bridge device;
   detect a new device within a communication range of the first device;
   transmit, via the first communication interface, to the new device an indication of default settings associated with the first device and a scheduled time to enter the awake mode, and
   prior to the first device, second device, and third device being switched from the sleep mode to the awake mode, synchronize, with an electronic processor of the new device, a time of the new device; and
  wherein the bridge device is configured to:
   receive the first message and the second message from the first time device,
   transmit the first message and the second message to a remote server, and
   transmit time information to the first time device.

10. The system of claim 9, wherein the first electronic processor is also configured to determine whether a predetermined period has elapsed, and wherein the first electronic processor controls the first communication interface to switch to the awake mode in response to determining that the predetermined period has elapsed.

11. The system of claim 9, wherein the first communication interface is configured to
 receive the first RSSI value associated with the second device,
 wherein the first electronic processor is configured to compare the first RSSI value to an RSSI threshold, and determine the first communication path to transmit the first message when the first RSSI value exceeds the RSSI threshold.

12. The system of claim 11, wherein the first communication interface is configured to receive a second RSSI value associated with the third device, wherein the first electronic processor is configured to determine the first communication path when the first RSSI value exceeds the second RSSI value.

13. The system of claim 11, wherein the first electronic processor is configured to change the RSSI threshold when the first RSSI value is below the RSSI threshold.

14. The system of claim 9, wherein the first communication interface is configured to receive a third message from the second device, the third message including a current time, and wherein the first electronic processor is configured to update a time display of the first time device based on the third message.

15. The system of claim 14, wherein the first communication interface is configured to
 transmit an acknowledgement message to the second device in response to receiving the third message;
 transmit a request for an elapsed time from the second device, the elapsed time corresponding to time elapsed between sending the third message and receiving the acknowledgement message; and receive from the second device the elapsed time;

wherein the first electronic processor updates the time display based on the elapsed time.

* * * * *